United States Patent
Tseng

(10) Patent No.: US 9,681,366 B2
(45) Date of Patent: Jun. 13, 2017

(54) ELECTRONIC DEVICE AND METHOD FOR CONTROLLING THE SAME

(71) Applicant: HTC Corporation, Taoyuan (TW)

(72) Inventor: Chi-Jung Tseng, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 0 days.

(21) Appl. No.: 14/876,423

(22) Filed: Oct. 6, 2015

(65) Prior Publication Data

US 2017/0099627 A1    Apr. 6, 2017

(51) Int. Cl.
*H04W 4/00* (2009.01)
*H04W 48/16* (2009.01)

(52) U.S. Cl.
CPC ........... *H04W 48/16* (2013.01); *H04W 4/008* (2013.01)

(58) Field of Classification Search
CPC .............................. H04W 48/16; H04W 4/008
USPC ............ 455/404.2, 414.1–414.2, 418–422.1, 455/435.3–453, 41.1, 41.3, 552.1, 550.1, 455/456.1–456.3, 457, 562.1; 370/328–332, 338
See application file for complete search history.

(56) References Cited

U.S. PATENT DOCUMENTS

| | | | | |
|---|---|---|---|---|
| 8,443,063 B1* | 5/2013 | Nelson | ................. | H04W 48/00 709/221 |
| 8,738,035 B1* | 5/2014 | Ramakrishnan | ........ | G01S 19/48 342/451 |
| 9,088,412 B2* | 7/2015 | Yan | ........................ | H04L 1/1812 |
| 2006/0217147 A1* | 9/2006 | Olvera-Hernandez | | H04W 36/005 455/552.1 |
| 2007/0060125 A1* | 3/2007 | Rahim | .................. | H04W 48/16 455/436 |
| 2008/0252518 A1* | 10/2008 | Yeshayahu | ............ | G01S 5/0263 342/357.31 |
| 2010/0234017 A1* | 9/2010 | Lim | ..................... | H04L 12/2807 455/426.1 |
| 2011/0044240 A1* | 2/2011 | Jang | ..................... | H04L 12/4633 370/328 |
| 2011/0075604 A1* | 3/2011 | Fong | ..................... | H04L 63/162 370/328 |
| 2012/0327225 A1* | 12/2012 | Barley | ................... | H04N 7/188 348/143 |
| 2015/0155891 A1* | 6/2015 | Soliman | ............... | H04B 1/0067 455/552.1 |
| 2015/0264520 A1* | 9/2015 | Beauregard | ........... | H04W 64/00 455/456.1 |
| 2016/0112991 A1* | 4/2016 | Chen | ...................... | H04B 15/00 455/553.1 |

* cited by examiner

*Primary Examiner* — Babar Sarwar
(74) *Attorney, Agent, or Firm* — Birch, Stewart, Kolasch & Birch, LLP

(57) ABSTRACT

A method for controlling a first electronic device is provided. The first electronic device has a first antenna and a second antenna. The method includes the following steps. A data is transmitted between the first electronic device and a second electronic device by the first antenna. Determining whether the second antenna is idle or not. Scanning by the second antenna is performed when the second antenna is idle.

19 Claims, 3 Drawing Sheets

ELECTRONIC DEVICE AND METHOD FOR CONTROLLING THE SAME

TECHNICAL FIELD

The disclosure relates in general to an electronic device and a method for controlling an electronic device, and more particularly to an electronic device having at least two antennas and a method for controlling an electronic device having at least two antennas.

BACKGROUND

With the development of the wireless technology, various services are provided on the electronic device. For example, the data can be transmitted from an electronic device to another electronic device by the wireless technology. Particularly, when the electronic device uses one antenna to transmit the video data to a display device and perform scanning, the transmission of the video data will be influenced or interrupted by the operation of scanning. It causes the image displayed on the display device have defects and the quality of the image is reduced. Therefore, how to improve the quality of data transmission between electronic devices is emphasized by the industry.

SUMMARY

According to one embodiment, a method for controlling a first electronic device is provided. The first electronic device has a first antenna and a second antenna. The method includes the following steps. A data is transmitted between the first electronic device and a second electronic device by the first antenna. Determining whether the second antenna is idle or not. Scanning by the second antenna is performed when the second antenna is idle.

According to another embodiment, a first electronic device is provided. The first electronic device includes a first antenna, a second antenna and a processor. A first antenna is for transmitting a data between the first electronic device and a second electronic device. The processor is for determining whether the second antenna is idle or not, and using the second antenna to perform scanning when the second antenna is idle.

According to another embodiment, a non-transitory storage media for storing a program code is provided. When the program code is executed by a first electronic device, the first electronic device performs a method for controlling the first electronic device. The first electronic device has a first antenna and a second antenna. The method includes following steps. A data is transmitted between the first electronic device and a second electronic device by the first antenna. Determining whether the second antenna is idle or not. Scanning by the second antenna is performed when the second antenna is idle.

The above and other aspects of the disclosure will become better understood with regard to the following detailed description of the non-limiting embodiment(s). The following description is made with reference to the accompanying drawings.

DETAILED DESCRIPTION

Figure 1:
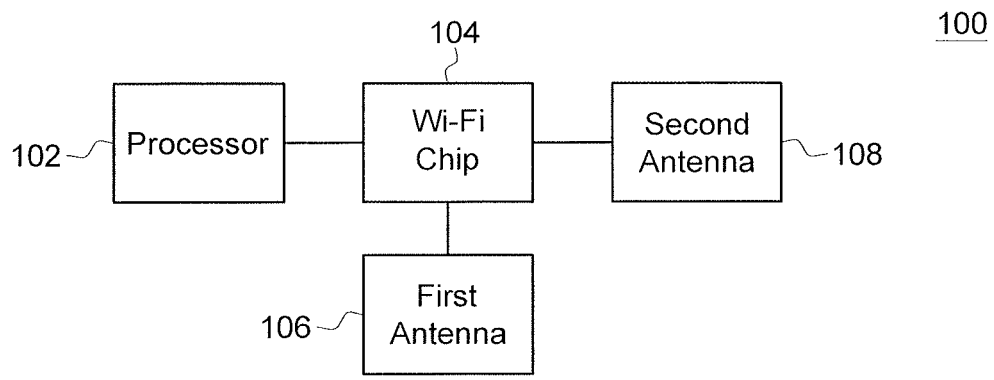
FIG. 1 shows the block diagram of the first electronic device.

FIG. 1 shows the block diagram of a first electronic device 100. The first electronic device 100 can have Wi-Fi communication function. The first electronic device 100 includes a processor 102, a Wi-Fi chip 104, a first antenna 106, and a second antenna 108. The processor 102 controls the Wi-Fi chip 104. The Wi-Fi chip 104 controls the first antenna 106 and the second antenna 108. The second antenna 108 performs scanning when the first antenna 106 transmits the data between the first electronic device 100 and another electronic device.

Figure 2:
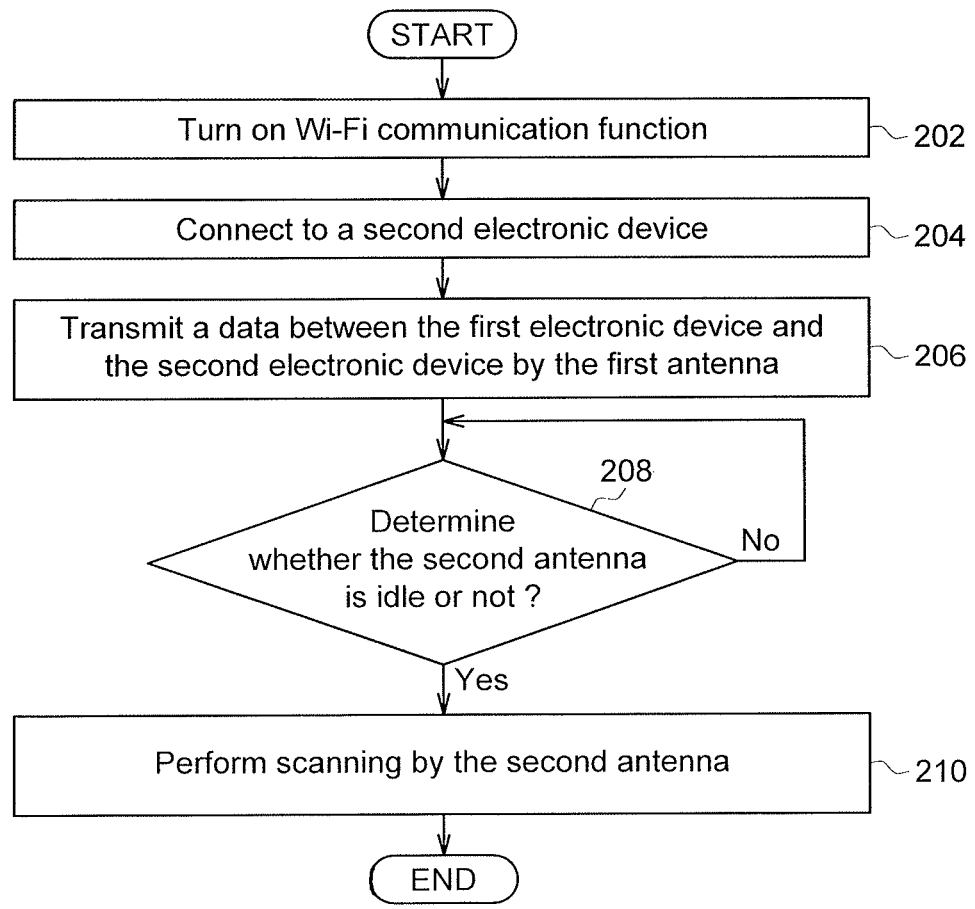
FIG. 2 shows a flow chart for a method for controlling the first electronic device according to an embodiment of the invention.
Figure 3:
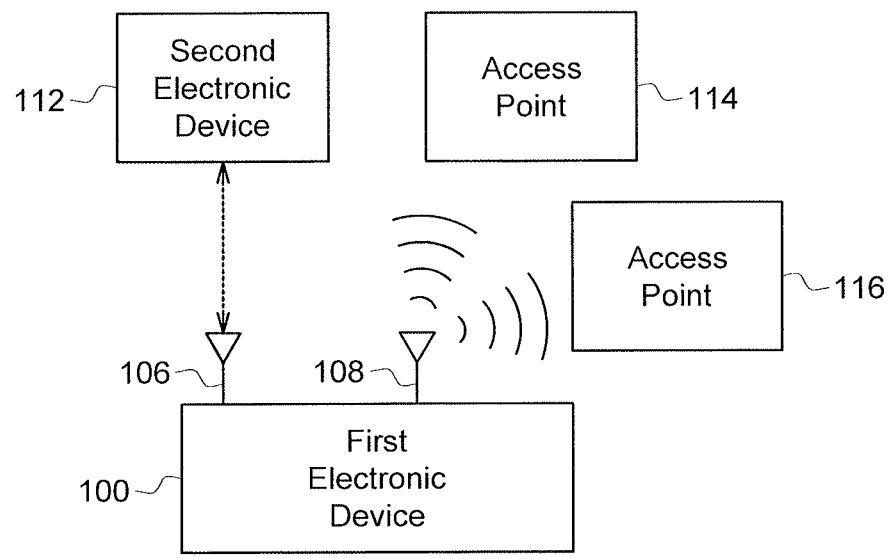
FIG. 3 shows a schematic diagram of the first electronic device, a second electronic device, and access points.

Referring to FIG. 1, FIG. 2, and FIG. 3, FIG. 2 shows a flow chart for a method for controlling the first electronic device 100 according to an embodiment of the invention. FIG. 3 shows a schematic diagram of the first electronic device 100, a second electronic device 112, an access point 114 and an access point 116. First, in step 202, the Wi-Fi communication function of the first electronic device 100 is turned on. For example, the processor 102 controls the Wi-Fi chip 104 to activate the first antenna 106 and the second antenna 108.

In step 204, the first electronic device 100 is connected to the second electronic device 112. For example, the first electronic device 100 uses the first antenna 106 to be connected to the second electronic device 112. The second electronic device 112 may be at least one of an access point, a Miracast device, a mobile device having the Wi-Fi communication function and a display device having the Wi-Fi communication function.

In step 206, the first antenna 106 transmits a data between the first electronic device 100 and the second electronic device 112. The data is at least one of multimedia data, video data, and audio data. When the second electronic device 112 is implemented by the Miracast device or the display device having the Wi-Fi communication function, the first electronic device 100 transfers and/or receives the data to and/or from the second electronic device 112 by the first antenna 106. When the second electronic device 112 is implemented by the access point, the first electronic device 100 transfers and/or receives the data to and/or from the second electronic device 112 by the first antenna 106.

Next, in step 208, the processor 102 determines whether the second antenna 108 is idle or not. In one embodiment, an antenna is determined as idle if it is not used for transmitting/receiving data or it is in power off state. If the second antenna 108 is idle, step 210 is performed. If the second antenna 108 is not idle, step 208 is repeated or directly go to the end step. The processor 102 determines whether the second antenna 108 is idle or not, for example, when the first antenna 106 transmits the data between the first electronic device 100 and the second electronic device 112.

In step 210, if a Wi-Fi scan operation is requested by operating system or applications, the second antenna 108 performs scanning when the second antenna 108 is idle. For example, when the second antenna 108 is idle, the processor 102 controls the second antenna 108 to scan at least one access point in the channels of at least one of 2.4 GHz frequency and 5 GHz frequency. One example of performing scanning is as follows. The first electronic device 100 uses the second antenna 108 to transmit packets in the channels of 2.4 GHz frequency to scan for another electronic device. If there is any electronic device (for example, the access point 114) receiving the packets in any of the channels of 2.4 GHz frequency from the second antenna 108, the access point 114 will transmit a response packet to the first electronic device 100. Besides, the first electronic device 100 can use the second antenna 108 to transmit the packets to some channels which are not dynamic frequency selection (DFS) channels of 5 GHz frequency to scan for another electronic device. If there is any electronic device, for example, the access point 116, receives the packets in the channels of 5 GHz frequency, the access point 116 will transmit a response packet to the first electronic device 100. Based on above, the first electronic device 100 can use the second antenna 108 to scan the access point 114 and the access point 116 by transmitting the packets in the channel of 2.4 GHz frequency and 5 GHz frequency.

Figure 4:
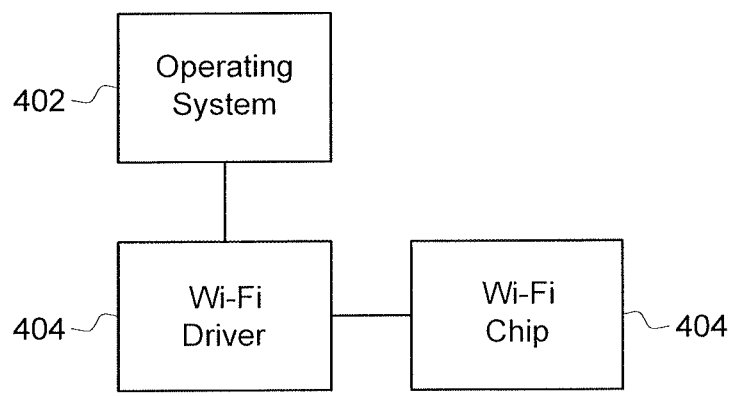
FIG. 4 shows an example of a software/hardware architecture of the first electronic device.
Figure 5:
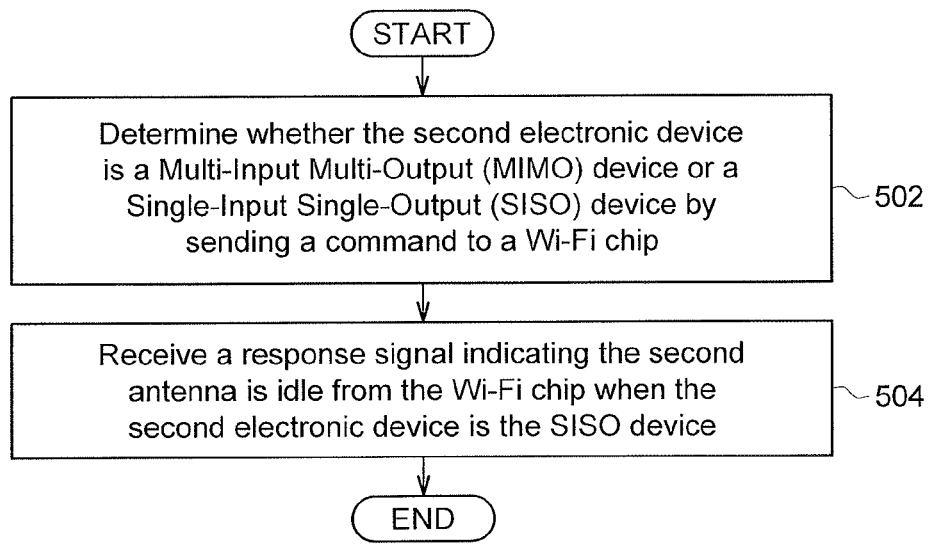
FIG. 5 shows the detailed description of step 208 according to an embodiment of the invention.

Referring to FIGS. 4 and 5, FIG. 4 shows an example of a software/hardware architecture of the first electronic device 100. FIG. 5 shows the detailed description of step 208 according to an embodiment of the invention. Step 208 includes steps 502 and 504. In step 502, the operating system 402 determines whether the second electronic device 102 is a Multi-Input Multi-Output (MIMO) device or a Single-Input Single-Output (SISO) device by sending a command to a Wi-Fi chip 104. For example, the operating system 402 controls the Wi-Fi driver 404 to send the command to Wi-Fi chip 104.

In step 504, the operating system 402 receives a response signal indicating the second antenna is idle from the Wi-Fi chip 104. In one embodiment, the operating system 402 receives the response signal indicating the second antenna is idle from the Wi-Fi chip 104 when the second electronic device 102 is SISO device. When the second electronic device is the SISO device which uses only one antenna to transfer or receive the data, it indicates that the first electronic device 100 uses only one antenna, e.g. the first antenna 106, to transfer the data to the second electronic device 102 or receive the data from the second electronic device 102. Therefore, when the second electronic device is the SISO device, it is determined that only the one of the two antennas of the first electronic device 100 is used, for example, the first antenna 106 is used. Accordingly, the Wi-Fi chip 104 generates the response signal indicating another antenna of the two antennas, for example, the second antenna 108, is idle. Then, the response signal is received by the Wi-Fi driver 404, and the Wi-Fi driver 404 sends the response signal to the operating system 402. In one embodiment, the Wi-Fi chip 104 generates the response signal indicating which antenna of the two antennas, for example, the second antenna 108, is idle, then the first electronic device 100 can use the specified antenna to perform scanning.

Instead, when the second electronic device is the MIMO device which uses at least two antennas to transfer or receive the data, it indicates that the first electronic device 100 uses at least two antennas, e.g. at least the first antenna 106 and the second antenna 108, to transfer the data to the second electronic device or receive the data from the second electronic device. That is, the number of the antennas used in the first electronic device 100 is the same as the number of the antennas used in the second electronic device when the first electronic device 100 has two antennas and the second electronic device is the MIMO device. It can be determined that the two antennas of the first electronic device 100 are both used, for example, the first antenna 106 and the second antenna 108 are both used and therefore the second antenna 108 is not idle. Other way for determining whether the second antenna 108 is idle can also be applied in this embodiment.

Although the above embodiments are exemplified by Wi-Fi communication, the invention is not limited thereto and can also be used in other type of wireless communications. For example, the above embodiments are also can be applied in Bluetooth communication. The first electronic device 100 and the second electronic device may have Bluetooth communication function, and the first electronic device 100 may have a Bluetooth chip to control the first antenna 106 and the second antenna 108. The first electronic device 100 may communicate with the second electronic device by one of the first antenna 106 and second antenna 108.

Furthermore, according to one embodiment, a non-transitory storage media for storing a program code is provided. When the program code is executed by the first electronic device 100, the first electronic device 100 performs the method for controlling the first electronic device 100 described above.

Base on the above, the electronic device has at least two antennas. And the electronic device can use an antenna which is idle to perform scanning when the other antenna transmits the data. Therefore, the data transmission will not be influenced and interrupted by the operation of scanning. Therefore, the video data can be transmitted continuously and smoothly. The defects of the image displayed on the display device can be highly reduced and the quality of the image displayed on the display device is improved. Similarly, the multimedia data and audio data can also be transmitted continuously and smoothly, and the multimedia data and audio data can be played with high quality.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for controlling a first electronic device having a first antenna of a Wireless Fidelity (Wi-Fi) chip and a second antenna of the Wi-Fi chip, the method comprising:
   transmitting a data between the first electronic device and a second electronic device by the first antenna of the Wi-Fi chip;
   determining whether the second antenna of the Wi-Fi chip is idle without transmitting or receiving data or not; and
   performing Wi-Fi scanning by the second antenna of the Wi-Fi chip only when the first antenna of the Wi-Fi chip is transmitting or receiving data and the second antenna of the Wi-Fi chip is idle without transmitting or receiving data.

2. The method according to claim 1, wherein the step of determining whether the second antenna of the Wi-Fi chip is idle without transmitting or receiving data or not comprises:
   determining whether the second antenna of the Wi-Fi chip is idle or not by sending a command to the Wi-Fi chip of the first electronic device; and
   receiving a response signal indicating the second antenna of the Wi-Fi chip is idle from the Wi-Fi chip;
   wherein the Wi-Fi chip controls the first antenna of the Wi-Fi chip and the second antenna of the Wi-Fi chip.

3. The method according to claim 1, wherein the number of antennas of the first electronic device is more than the number of antennas of the second electronic device.

4. The method according to claim 1, wherein the data is at least one of multimedia data, video data and audio data.

5. The method according to claim 1, wherein the step of performing Wi-Fi scanning by the second antenna of the Wi-Fi chip when the first antenna of the Wi-Fi chip is transmitting or receiving data and the second antenna of the Wi-Fi chip is idle without transmitting or receiving data comprises:
scanning at least one access point in the channels of at least one of 2.4 GHz frequency and 5 GHz frequency.

6. The method according to claim 1, wherein the second electronic device is a Single-Input Single-Output (SISO) device.

7. The method according to claim 1, wherein the first electronic device has Wi-Fi communication function to communicate with the second electronic device by the first antenna, and the second electronic device is at least one of an access point, a Miracast device, a mobile device having Wi-Fi communication function and a display device having Wi-Fi communication function.

8. The method according to claim 1, wherein the step of transmitting the data between the first electronic device and the second electronic device by the first antenna of the Wi-Fi chip comprises at least one of receiving the data from the second electronic device by the first antenna of the Wi-Fi chip of the first electronic device and transferring the data to the second electronic device by the first antenna of the Wi-Fi chip of the first electronic device.

9. A first electronic device, comprising:
a first antenna of a Wireless Fidelity (Wi-Fi) chip for transmitting a data between the first electronic device and a second electronic device;
a second antenna of the Wi-Fi chip; and
a processor for determining whether the second antenna of the Wi-Fi chip is idle without transmitting or receiving data or not, and using the second antenna of the Wi-Fi chip to perform Wi-Fi scanning only when the first antenna of the Wi-Fi chip is transmitting or receiving data and the second antenna of the Wi-Fi chip is idle without transmitting or receiving data.

10. The first electronic device according to claim 9, wherein the first electronic device further comprises:
the Wi-Fi chip controls the first antenna of the Wi-Fi chip and the second antenna of the Wi-Fi chip, and the processor sends a command to the Wi-Fi chip to determine whether the second antenna of the Wi-Fi chip is idle or not, and receives a response signal from the Wi-Fi chip, the response signal indicates the second antenna of the Wi-Fi chip is idle.

11. The first electronic device according to claim 9, wherein the number of antennas of the first electronic device is more than the number of antennas of the second electronic device.

12. The first electronic device according to claim 9, wherein the data is at least one of multimedia data, video data and audio data.

13. The first electronic device according to claim 9, wherein the second antenna of the Wi-Fi chip scans at least one access point in the channels of at least one of 2.4 GHz frequency and 5 GHz frequency.

14. The first electronic device according to claim 9, wherein the second electronic device is a Single-Input Single-Output (SISO) device.

15. A non-transitory storage media for storing a program code, wherein when the program code is executed by a first electronic device, the first electronic device performs a method for controlling the first electronic device, the first electronic device has a first antenna of a Wireless Fidelity (Wi-Fi) chip and a second antenna of the Wi-Fi chip, the method comprises:
transmitting a data between the first electronic device and a second electronic device by the first antenna of the Wi-Fi chip;
determining whether the second antenna of the Wi-Fi chip is idle without transmitting or receiving data or not; and
performing Wi-Fi scanning by the second antenna of the Wi-Fi chip only when the first antenna of the Wi-Fi chip is transmitting or receiving data and the second antenna of the Wi-Fi chip is idle without transmitting or receiving data.

16. The non-transitory storage media according to claim 15, wherein the step of determining whether the second antenna of the Wi-Fi chip is idle without transmitting or receiving data or not comprises:
determining whether the second antenna of the Wi-Fi chip is idle or not by sending a command to the Wi-Fi chip of the first electronic device; and
receiving a response signal indicating the second antenna of the Wi-Fi chip is idle from the Wi-Fi chip;
wherein the Wi-Fi chip controls the first antenna of the Wi-Fi chip and the second antenna of the Wi-Fi chip.

17. The non-transitory storage media according to claim 15, wherein the number of antennas of the first electronic device is more than the number of antennas of the second electronic device.

18. The non-transitory storage media according to claim 15, wherein the data is at least one of multimedia data, video data and audio data.

19. The non-transitory storage media according to claim 15, wherein the second electronic device is a Single-Input Single-Output (SISO) device.

* * * * *